US007587341B2

(12) United States Patent  (10) Patent No.: US 7,587,341 B2
Wagner et al.  (45) Date of Patent: Sep. 8, 2009

(54) METHOD AND SYSTEM FOR DIRECTING THE SOURCING OF A PART OR COMPONENT FROM A SECONDARY SUPPLIER

(75) Inventors: Laura Wagner, Dearborn, MI (US); Ron Cirihal, Commerce Township, MI (US); Yen Truong, Brentwood (GB); Jill Forbis, Commerce Township, MI (US); Trish Webb, Canton, MI (US); Andy Moir, Chelmsford (GB)

(73) Assignee: Ford Motor Company, Dearborn, MI (US)

( * ) Notice: Subject to any disclaimer, the term of this patent is extended or adjusted under 35 U.S.C. 154(b) by 585 days.

(21) Appl. No.: 10/905,388

(22) Filed: Dec. 30, 2004

(65) Prior Publication Data

US 2006/0149636 A1  Jul. 6, 2006

(51) Int. Cl.
*G06Q 30/00* (2006.01)
*G06F 17/50* (2006.01)
(52) U.S. Cl. .......................................... 705/26; 705/29
(58) Field of Classification Search ................... 705/26, 705/27, 29
See application file for complete search history.

(56) References Cited

U.S. PATENT DOCUMENTS

| | | | |
|---|---|---|---|
| 5,712,989 A | 1/1998 | Johnson et al. | |
| 5,870,717 A | 2/1999 | Wiecha | |
| 7,050,874 B1* | 5/2006 | Tenorio | 700/107 |
| 7,069,230 B2* | 6/2006 | Krystek et al. | 705/9 |
| 2001/0042030 A1 | 11/2001 | Ito et al. | |
| 2002/0099612 A1* | 7/2002 | Seaman et al. | 705/26 |
| 2002/0111839 A1* | 8/2002 | Nayak et al. | 705/7 |
| 2002/0138316 A1 | 9/2002 | Katz et al. | |
| 2002/0152133 A1* | 10/2002 | King et al. | 705/26 |
| 2002/0174000 A1 | 11/2002 | Katz et al. | |
| 2003/0004850 A1 | 1/2003 | Li et al. | |
| 2003/0033179 A1 | 2/2003 | Katz et al. | |
| 2003/0093340 A1* | 5/2003 | Krystek et al. | 705/28 |
| 2003/0126025 A1 | 7/2003 | Powell et al. | |
| 2003/0172008 A1 | 9/2003 | Hage et al. | |

(Continued)

OTHER PUBLICATIONS

"Supplier Relationship Management for Sourcing & Procurement", An Oracle® White Paper, Holly A. Roland, Apr. 2002.

(Continued)

*Primary Examiner*—Jeffrey A Smith
*Assistant Examiner*—Amee A Shah
(74) *Attorney, Agent, or Firm*—Raymond L. Coppiellie; Brooks Kushman P.C.

(57) ABSTRACT

A purchasing entity directs the sourcing of one or more components of a part in a microprocessor-based method. The microprocessor-based method comprises generating a listing for a part that identifies the one or more components. Such a listing is stored in digital electronic form and is accessible by a microcomputer-based system. The purchasing entity then enters into a purchase agreement with a secondary supplier for at least one component of the one or more components. The purchasing entity then obtains a quotation from a primary supplier for the part with the secondary supplier specified as a supplier for at least one component. A computer system for directed sourcing that includes a computer network including one or more computers and which executes the method of the invention is also provided.

7 Claims, 4 Drawing Sheets

U.S. PATENT DOCUMENTS

2004/0044591 A1* 3/2004 Gilliland et al. .............. 705/27
2004/0054603 A1 3/2004 Clinesmith et al.
2004/0210510 A1* 10/2004 Cullen et al. ................. 705/37

OTHER PUBLICATIONS

Press Release, EMPTORIS, "Emptoris Announces ePass Version 3.0 to Power Online Collaborative Strategic Sourcing", Apr. 30, 2004, 4 pgs.

E-Catalogs: The Source for Online Interaction, Apr. 30, 2004, "Interaction with customers and suppliers is increasingly taking place online. A continuously updated online catalog integrated with a company's business systems is essential", Scott Cronenweth, Jan. 30, 2002.

Dialog Search, "Aggressive sourcing: a free-market approach", Kapoor, Vikas, Gupta, Arnab, Sloan Management Review, v39, n1, p. 21(11), Fall, 1987.

Dialog Search, "The Role of Materials Management in Developing Time-Based Competition", Robert B. Handfield, International Journal of Purchasing and Materials Management, v29, n1, p. 2(9), Winter, 1993.

Dialog Search, "Cost Forecasting Service Empowers Pms", Diane Trommer, Electronic Buyer's News, 1996, n993, pgP8.

* cited by examiner

METHOD AND SYSTEM FOR DIRECTING THE SOURCING OF A PART OR COMPONENT FROM A SECONDARY SUPPLIER

BACKGROUND OF THE INVENTION

1. Field of the Invention

The present invention relates to methods of directing the sourcing of a part or a component from a secondary supplier.

2. Background Art

As the size and complexity of manufactured articles increases, the complexity of efficient component purchasing systems for such articles increases. Manufactured items such as automobiles include numerous sub-systems each of which include a number of components. For example, automobiles include a powertrain system, sound systems, exhaust systems, environmental control systems, computer control systems, and the like. Moreover, market and governmental pressures require the constant design and redesign of these systems. Each system includes many discrete subcomponents that are purchased from suppliers.

Experience in the purchase of automobile components has shown that it is desirable to purchase parts from only a select few suppliers that are called Tier 1 suppliers. The advantages of dealing with such a reduced numbers of suppliers include a reduction in accounting expenses, improved component quality, and associated reduction in component expenses. The reduction in accounting expenses is the result of having to monitor and track the performance of a smaller number of primary suppliers. Improved quality is the result of suppliers competing for the coveted Tier 1 status, and from the experience the supplier obtains over time in having such a status. Moreover, the reduction in component costs is a direct result in the competition and experience associated with Tier 1 status.

Notwithstanding the advantages in dealing with a reduced number of suppliers, there are associated problems. Complex manufactured components often include a large number of components. Moreover, a large manufacturing company may manufacture a number of articles each of which include a number of components. Accordingly, it is not always possible to obtain every part from the Tier 1 suppliers.

Manufacturing companies have used various methods to deal with the inadequacies in only purchasing from Tier 1 suppliers. Such methods have typically involved participation by the manufacturing company in the purchasing of parts from secondary suppliers referred to as Tier 2 suppliers. Tier 2 suppliers are those suppliers from which Tier 1 suppliers purchase components. For example, a Tier 1 supplier purchase a part from a Tier 2 supplier and store it until needed by the manufacturing company. Such a situation then creates a bailor-bailee relationship between the manufacturing company and the Tier 1 supplier which may include several undesirable legal consequences.

Another difficulty encountered in the purchase of parts from Tier 2 suppliers is the inability of current purchasing systems to negotiate price with the Tier 2 or higher suppliers. Most purchasing systems are designed to only deal with the Tier 1 supplier, since it is the Tier 1 suppliers role to deal with the Tier 2 supplier. Accordingly, a manufacturing company significantly loses negotiating and leveraging ability with Tier 2 suppliers.

Accordingly, there is a need in the prior art for improved purchasing systems that directly integrate the sourcing process with both Tier I and Tier II suppliers and allow prices to be negotiated with secondary suppliers.

SUMMARY OF THE INVENTION

The present invention solves one or more problems of the prior art by providing in one embodiment a method by which a purchasing entity directs the sourcing of one or more components of a part. The method of the invention comprises generating a listing for a part that identifies the one or more components. Such a listing is stored in digital electronic and is accessible by a microcomputer-based system. The purchasing entity then enters into a purchase agreement with a secondary supplier for at least one component of the one or more components. The purchasing entity then obtains a quotation from a primary supplier for the part, wherein the primary supplier is directed to specify the secondary supplier as a supplier for the at least one component.

In another embodiment of the invention, a computer system for directed sourcing is provided. The computer system of the invention implements the methods of the invention. In particular, the computer system comprising a computer network including one or more computers operably programmed and configured to execute the methods of the invention. Specifically, the computer system makes available a listing for a part that identifies the one or more components. The listing being stored in digital form on an electronic storage medium. Moreover, the computer system also receives a quotation for the part from a primary supplier, wherein the primary supplier is directed to specify the secondary supplier as a supplier for the at least one component. During normal operation, a number of different classes of users will access the computer system of the invention. Moreover, a number of different methods of accessing the computer system of the invention may be used including both internet and intranet access.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

The term "purchasing entity" as used herein refers to any business entity that orders parts and components. A purchasing entity is typically a manufacturing company.

The term "primary supplier" as used herein refers to a supplier from which a business entity directly purchases parts or components. Typically, such suppliers are referred to as Tier 1 suppliers.

The term "secondary supplier" as used herein refers to a supplier from which a primary supplier purchases parts or components. Typically, such suppliers are referred to as Tier 2 suppliers when a Tier 1 supplier purchases part. Similarly, Tier 3 and higher suppliers are also identified and known in the art.

The term "computer network" as used herein refers to a plurality of computers that are operably connected to allow communication between each computer in the plurality. The definition of computer network includes arrangements of computers typically referred to in the art as intranets or the internet.

Figure 1:
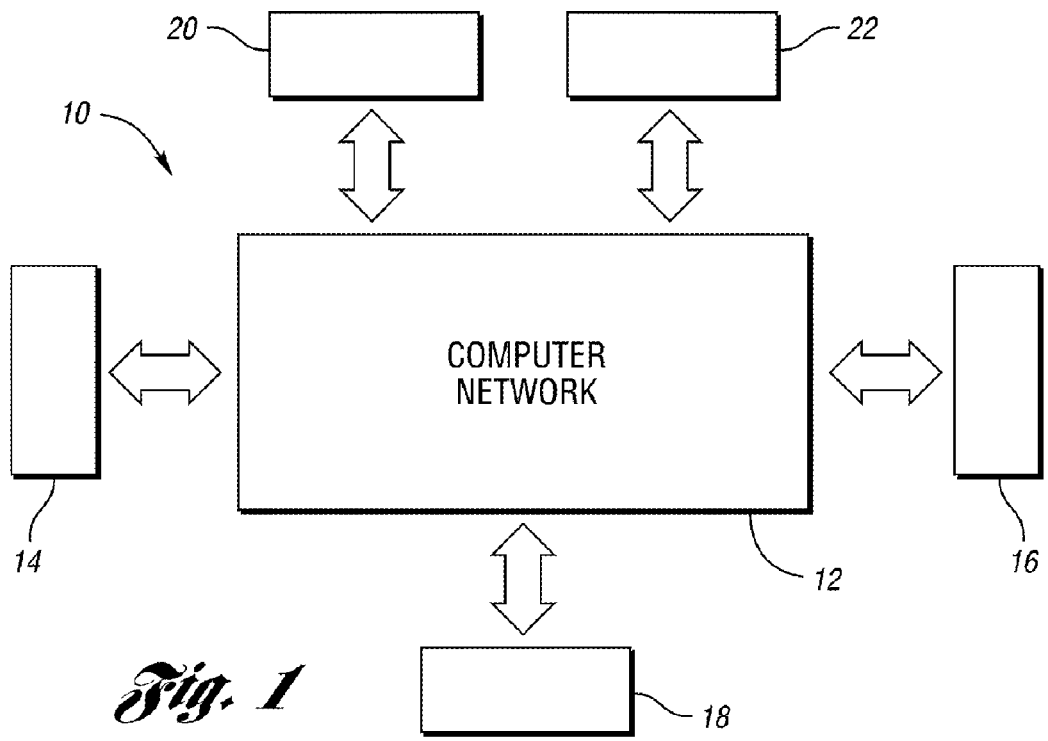
FIG. 1 is a schematic illustrating the interaction of users with a computer system executing the method of the invention.

In an embodiment of the invention, a method by which a purchasing entity directs the sourcing of one or more components of a part or system. The method of the invention is executed by a computer system that includes a computer network having one or more computers. With reference to FIG. 1, a schematic illustrating the interaction of users with the computer system executing the method of the invention is provided. Users of the system of this invention include, but are not limited to, employees of a purchasing entity authorized to initiate request for a purchase, buyers employed by a purchasing entity, agents of supplies, accounts payable employees of the purchasing entity, and like. Computer system 10 includes computer network 12 which includes one or more computers. Manufacturing activity 14 interacts with computer system 10 providing part volumes and information regarding which plants of the purchasing entity require which parts. Sourcing activity 16 interacts with computer system 10 to provide and analyze sourcing requirements to the system. Buyer activity 18 interacts with computer system 10 to generate a request for quotation and to review and approve quotations received from suppliers. Tier 1 supplier 20 interacts with computer system 10 to receive requests for quotations and to provide quotations. Similarly, Tier 2 supplier 22 interacts with computer system 10 to receive requests for quotations and to provide quotations.

Figure 2:
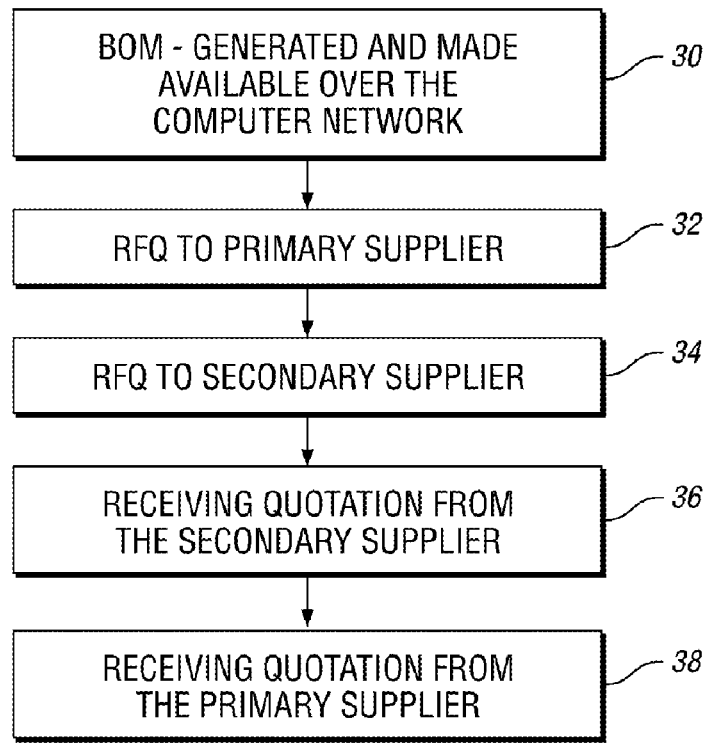
FIG. 2 is a flowchart outlining the steps of the method of the invention.
Figure 3A:
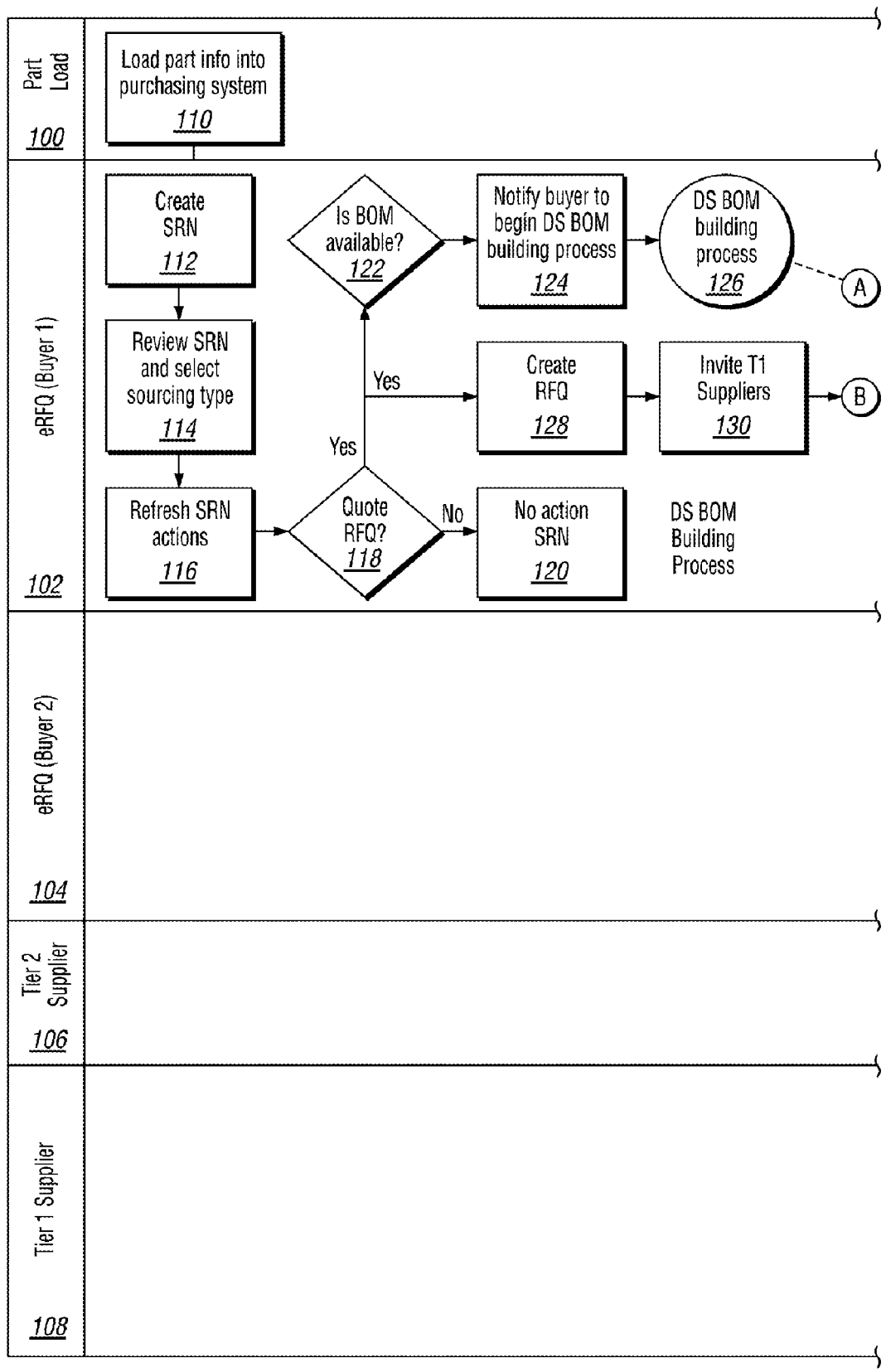
FIGS. 3a-3c are flowcharts which show the integration of the method of the invention is a realistic purchasing system.
Figure 3B:
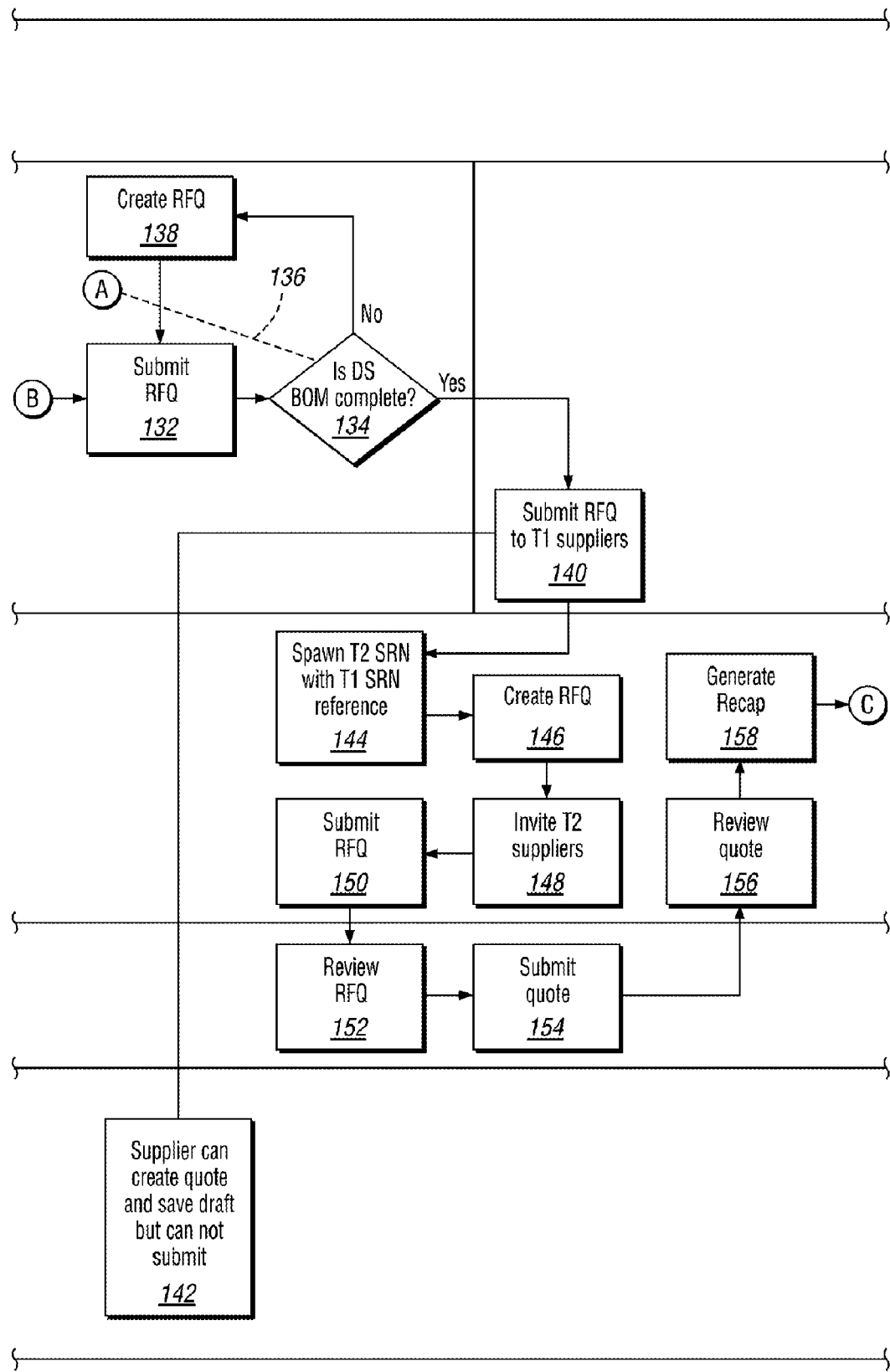
Figure 3C:
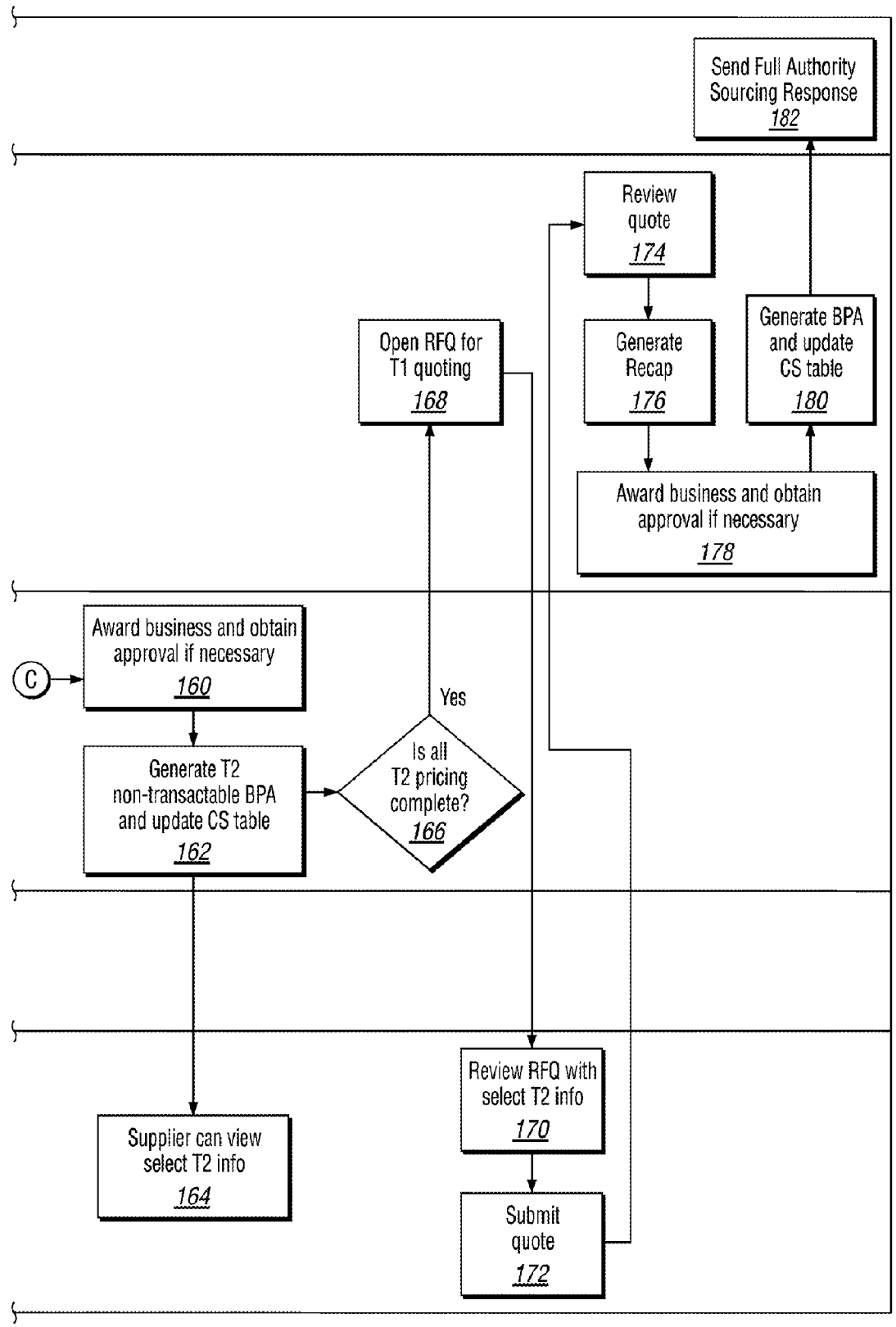

With reference to FIG. 2, a flowchart summarizing the method executed by computer system 10 is provided. The method of the invention comprises step 30 of generating a listing for a part that identifies the one or more components. Such a listing, which is typically called a bill of materials ("BOM") is stored in digital form on an electronic storage medium. Examples of such digital storage media include, but are not limited to, hard drives, optical drives, compact discs, DVDs, magnetic storage tapes, floppy drives, RAM memory, ROM memory and combinations thereof. Moreover, the listing is made accessible over a computer network. The next steps of the method involve the process in which quotations are received from primary and second suppliers. In step 32, a first request for quotation is made available to a primary supplier over the computer network. Similarly, a second request for quotation for the one or more components is made available to a secondary supplier over the computer network. Next, a secondary quotation is received by the purchasing entity for the one or more components from the secondary supplier (step 34). The purchasing entity then enters into a purchase agreement with a secondary supplier for at least one component of the one or more components (step 36). A primary quotation is received for the part from the primary supplier in step 38. Prior to formulating the primary quotation, the primary supplier is instructed by the purchasing entity to specify the secondary supplier for the one or more components, wherein the primary supplier is directed to specify the secondary supplier With reference to FIGS. 3a-3c, various flowcharts illustrate the integration of the method of the invention into a complex (and more realistic) purchasing system. It should be recognized that one or more steps of the method described by FIGS. 3a-3c are executed by a computer system. Such a computer system includes one or more computers that are programmed and configured to execute these steps. The method of the invention requires the integration of several layers of purchasing which in general are performed by different persons or groups of people. Therefore, as used herein the term "person" will be understood to mean a person or groups of people. In this example, the layers include part load layer 100 which represents the ordering of a part by a person within a company, buyer layer 102 which is mainly responsible for orders from a tier 1 supplier, buyer layer 104 which is mainly responsible for orders from a tier 2 supplier, tier 2 supplier layer 106, and tier 1 supplier layer 108. For purposes of this example, the primary supplier is referred to as the Tier 1 supplier and the secondary supplier is referred to as the Tier 2 supplier. FIGS. 3a-3c are structured so the actions of each layer and the interactions between the layers are evident. The purchasing system is invoked by loading step 110 in which information about an item to be purchased is loaded into the purchasing system. Step 110 will typically involve a user inputting data over the computer network from a computer or terminal. A sourcing request notification ("SRN") is then generated in step 112. The SRN is then reviewed and the sourcing type is selected in step 114. The selection of the type of sourcing means whether the sourcing is directed or not. In Step 116 the SRN actions are refreshed such that based on the type of SRN different options are presented. Next, decision step 118 is reached in which a decision to create a request for quote ("RFQ") is made. If an RFQ is not created no action is taken as indicated in step 120. If an RFQ is created a parallel multistep process ensues. The computer system checks to see if a directed sourcing bill of materials ("DS-BOM") is available at decision step 122. If the DS-BOM is available, no further action is necessary with regard to generating the DS-BOM. If a DS-BOM is not available, the buyer is notified to begin the DS-Building process in step 124. Item 126 represents the DS-BOM building process. In addition to the DS-BOM building process, a RFQ is created in RFQ creation step 128 after an affirmative response in decision step 118. In step 130 selected Tier 1 suppliers are invited to participate in the RFQ process. Next, RFQ submission step 132 is reached wherein the RFQ is submitted. In decision step 134, a determination is made if a DS-BOM is completed. Dashed line 136 provides an indication that such a DS-BOM was generated in steps 122-126. If the DS-BOM is not completed an error is indicated in error message step 138. The quote is resubmitted to RFQ submission step 132 and the process repeated until the DS-BOM is ready. When the DS-BOM material is available, the RFQ is submitted to the Tier 1 suppliers in Tier 1 supplier submission step 140. At this point in time, a Tier 1 supplier may be permitted to generate a quote but such a quote may not be submitted as indicated by step 142. It should be appreciated, as indicated by the layering of FIGS. 3a-3c, that steps 112 through 140 are performed by a first buyer.

Still referring to FIGS. 3a-3c, a second buyer will generate a Tier 2 SRN for one or more items that are listed on the DS-BOM as illustrated in a Tier 2 SRN generation step 144. A quote for these Tier 2 suppliers is generated in step 146 with Tier 2 suppliers allowed to participate in step 148. The RFQ is submitted in step 150 to the purchasing system and is made available to the Tier 2 supplier for review in step 152. After reviewing the RFQ, the Tier 2 supplier may submit a quote in step 154. This Tier 2 supplier quote is reviewed by the second buyer in step 156. A recap of the results of the purchasing process is generated (step 158) and business awarded to selected Tier 2 suppliers in step 160. At this time, a non-transactable blanket purchase agreement ("BPA") is generated in step 162. The non-transactable BPA is an agreement between the purchasing entity and the Tier 2 supplier enumerating the responsibilities of the Tier 2 supplier and the terms under which a given part will be supplied from the Tier 2 supplier to the Tier 1 supplier. Of particular importance, the price for the part is agreed to in the non-transactable BPA. The BPA is described as non-transactable because in the normal circumstances the Tier 1 supplier directly pays the Tier 2 supplier for the part with the purchasing entity benefitting indirectly from any price discounts (however, see the exceptions set forth below.) Also at this time, the complex sourcing table is updated. The complex sourcing table is a spreadsheet that used to track the suppliers used for each component of a part. In addition to tracking the suppliers used for each component of a part, this table indicates how a part is sourced (system integrator/commodity roll-up ("CI/CR") or Direct Sourced) for a given period of time. The complex sourcing table will typically be in electronic or digital form, being accessible over a computer network. Examples of the form the complex sourcing table might exist includes, databases, spreadsheets, word processing files, text-based files, entries in a website, and the like.

Still referring to FIGS. 3a-3c, the Tier 1 suppliers are optionally provided information about the Tier 2 suppliers (step 164). The information about the Tier 2 suppliers may or may not include the negotiated price for a component that the Tier 2 supplier is to supply. There are instances when it is not advantageous to reveal the negotiated price with the Tier 1 supplier (the primary supplier). Such circumstances include the situation when the Tier 1 and Tier 2 suppliers are competitors. In these instances, the primary supplier may be provided a place holder price to be used for purposes of determining the quotation. In such a situation, a rebate may be paid back to the purchasing entity from the Tier 2 supplier. Next, second buyer determines if all the Tier 2 pricing is complete in decision step 166. If the pricing is complete, the first buyer is notified. At which time, the first buyer opens up in step 168 the RFQ generated in step 128 for quoting by the Tier 1 suppliers. In review step 170, the Tier 1 suppliers will review the RFQ with select information about the Tier 2 suppliers. The Tier 1 suppliers will integrate this information into the quotations that they generate for quote submission step 172.

After the quotes have been submitted in step 172, the quotes are reviewed by the Tier 1 buyer in step 174. A recap of the quoting business in which the competitive quotations are summarized and compared is generated in step 176. Based on the received quotations, business is awarded in award business step 178 in accordance to the purchasing entity guidelines for awarding business with appropriate approvals being obtained. Such guidelines may include additional criteria beyond just simply awarding business to the lowest bidder. Such additional criteria may take into account the history of business with the Tier 1 supplier, the perceived quality of the parts supplied by the Tier 1 supplier, contracts with the Tier 1 supplier, and the like. At this time a BPA is generated (step 180) with the Tier 1 supplier and the complex sourcing table is updated to indicate that the selected Tier 1 supplier is responsible for supplying the part awarded in step 178. The process concludes with a full authority sourcing response being sent in step 182.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. In a microcomputer-based system, a method for enabling a purchasing entity to direct sourcing of one or more components of a part, the method comprising:
    a) electronically generating sourcing requirements for a part;
    b) electronically generating a listing for the part after electronically generating sourcing requirements for the part, wherein the listing identifies the one or more components, the listing being stored in digital form on an electronic storage medium;
    c) electronically transmitting a first request for quotation of the part in the listing to a primary supplier;
    d) electronically transmitting a second request for quotation of the one or more components from the purchasing entity to a secondary supplier;
    e) electronically receiving, at the purchasing entity, a first quotation from the secondary supplier for the one or more components in response to the second request;
    f) electronically generating a purchase agreement indicating that the secondary supplier provides the one or more components to the purchasing entity;
    g) electronically transmitting instructions to the primary supplier to specify the secondary supplier as a supplier for the one or more components in a primary quotation; and
    h) electronically receiving the primary quotation for the part from the primary supplier in response to (i) the first request and (ii) electronically transmitting with the microcomputer-based system, instructions to the primary supplier to specify the secondary supplier as the supplier.

2. The method of claim 1 further comprising determining whether the primary supplier and the secondary supplier are competitors with each other and establishing a negotiated piece price between the purchasing entity and the secondary supplier that is unknown to the primary supplier in the event the primary supplier is a competitor with the secondary supplier.

3. The method of claim 1 wherein sourcing requirements include an identification of the one or more components in the listing.

4. The method of claim 1 wherein the primary quotation received from the primary supplier includes pricing information for the part.

5. The method of claim 1 wherein electronically transmitting the first request for quotation of the part in the listing to the primary supplier further includes electronically transmitting the first request for quotation of the part in the listing from the purchasing entity to the primary supplier.

6. The method of claim 1 wherein electronically transmitting instructions to the primary supplier to specify the secondary supplier as the supplier for the one or more components in the primary quotation further includes electronically transmitting instructions, from the purchasing entity, to the primary supplier to specify the secondary supplier as the supplier for the one or more components in the primary quotation.

7. The method of claim 1 wherein electronically receiving the primary quotation for the part from the primary supplier further includes electronically receiving, at the purchasing entity, the primary quotation for the part from the primary supplier.

* * * * *

UNITED STATES PATENT AND TRADEMARK OFFICE
CERTIFICATE OF CORRECTION

PATENT NO. : 7,587,341 B2  Page 1 of 1
APPLICATION NO. : 10/905388
DATED : September 8, 2009
INVENTOR(S) : Wagner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 769 days.

Signed and Sealed this

Twenty-first Day of September, 2010

David J. Kappos
*Director of the United States Patent and Trademark Office*